(12) United States Patent
Li et al.

(10) Patent No.: US 11,050,469 B2
(45) Date of Patent: Jun. 29, 2021

(54) REFERENCE SIGNALING IN WITH ANTENNA ARRAYS

(71) Applicant: Telefonaktiebolaget LM Ericsson (publ), Stockholm (SE)

(72) Inventors: Shaohua Li, Beijing (CN); Qingyu Miao, Beijing (CN); Jianfeng Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/324,609

(22) PCT Filed: Aug. 12, 2016

(86) PCT No.: PCT/CN2016/095039
§ 371 (c)(1),
(2) Date: Feb. 11, 2019

(87) PCT Pub. No.: WO2018/027986
PCT Pub. Date: Feb. 15, 2018

(65) Prior Publication Data
US 2019/0173547 A1    Jun. 6, 2019

(51) Int. Cl.
*H04B 7/06*    (2006.01)
*H04B 7/0413*    (2017.01)

(52) U.S. Cl.
CPC ......... *H04B 7/0617* (2013.01); *H04B 7/0413* (2013.01)

(58) Field of Classification Search
CPC .. H04B 7/0617; H04B 7/0413; H04B 7/0695; H04B 7/0456; H04B 7/0639; H04B 7/088; H04B 7/0417; H04B 7/061; H04B 7/0619; H04B 7/0621; H04W 72/046; H04W 16/28
See application file for complete search history.

(56) References Cited

U.S. PATENT DOCUMENTS

| 2013/0059619 A1 | 3/2013 | Kim et al. |
| 2013/0217404 A1* | 8/2013 | Jung ............ H04W 72/08 455/452.1 |
| 2016/0057797 A1 | 2/2016 | Bangolae et al. |

(Continued)

FOREIGN PATENT DOCUMENTS

| CN | 103765794 A | 4/2014 |
| CN | 105340190 A | 2/2016 |
| WO | WO 2015169369 A1 | 11/2015 |

OTHER PUBLICATIONS

Ji et al. "Overview of Full-Dimension MIMO in LTE-Advanced Pro", Aug. 10, 2016, arxiv.org, pp. 1-22.*

(Continued)

*Primary Examiner* — Sophia Vlahos
(74) *Attorney, Agent, or Firm* — Sage Patent Group

(57) ABSTRACT

This disclosure pertains to a network node for a wireless communication network, the network node being adapted for transmitting reference signaling utilising an antenna array, the network node further being adapted for transmitting the reference signaling in a pattern, the pattern being determined based on a beamforming state for transmitting the reference signaling and/or based on a beam reception state.
The disclosure also pertains to related devices and methods.

17 Claims, 5 Drawing Sheets

(56) References Cited

U.S. PATENT DOCUMENTS

| 2016/0080052 | A1  | 3/2016  | Li et al. |
|---|---|---|---|
| 2016/0134352 | A1* | 5/2016  | Stirling-Gallacher ........................ H04B 7/0639 370/329 |
| 2016/0295454 | A1* | 10/2016 | Kim ...................... H04B 7/0456 |
| 2018/0115357 | A1* | 4/2018  | Park ......................... H04B 7/04 |
| 2019/0090218 | A1* | 3/2019  | Noh .................... H04W 72/005 |

OTHER PUBLICATIONS

International Search Report and Written Opinion of the International Searching Authority, PCT/CN2016/095039 dated May 2, 2017, 8 pages.

Extended European Search Report dated Jan. 21, 2020 for European Patent Application No. 16912441.9, 5 pages.

ZTE Corporation et al., "Discussion on CSI Reporting for Hybrid CSI-RS," R1-16413, 3GPP TSG RAN WG1 Meeting #85, Agenda Item 6.2.3.2.2, Nanjing, China, May 14, 2016, 6 pages.

* cited by examiner

REFERENCE SIGNALING IN WITH ANTENNA ARRAYS

CROSS REFERENCE TO RELATED APPLICATIONS

This application is a 35 U.S.C. § 371 national stage application of PCT International Application No. PCT/CN2016/095039 filed on Aug. 12, 2016, the disclosure and content of which is incorporated by reference herein in its entirety.

TECHNICAL FIELD

The present disclosure pertains to reference signaling in wireless communication systems, in particular in regards to systems utilising antenna arrays, respectively MIMO (Multiple Input, Multiple Output, an approach of managing antenna arrays).

BACKGROUND

In LTE Rel-13, full dimension MIMO (FD-MIMO) is specified. For 4.5G/5G development, very large multiple-input multiple-output (MIMO) or "massive MIMO" are currently investigated as novel cellular network architecture. In Massive MIMO, there may be a large number of antennas, e.g. 128 antennas on the BS (Base Station) side. In 3GPP, some companies proposed to have up to 1024 antennas for BS.

The use of many antennas in wireless telecommunication systems can introduce undesirable overhead and/or interference, in particular in the context of reference signaling.

SUMMARY

It is an object of the present disclosure to provide approaches improving reference signaling in wireless communication utilising increasingly large antenna arrays, in particular for massive MIMO.

In this context, massive MIMO may be considered to pertain to usage of antenna arrays for transmitting reference signaling that comprise 64 or more, or 96 or more, or 128 or more, or 256 or more antennas. Each antenna in MIMO may generally be controllable independently from other antennas. Such an individually controllable antenna may also be referred to as antenna element.

There is described a network node for a wireless communication network. The network node is adapted for, and/or comprises a transmitting node for, transmitting reference signaling utilising an antenna array. The network node is adapted for transmitting the reference signaling in a pattern, the pattern being determined based on a beamforming state for transmitting the reference signaling and/or based on a beam reception state. The network node may be adapted for determining the pattern, and/or comprise a corresponding determining module.

Moreover, there is disclosed a method for operating a network node in a wireless communication network, the method comprising transmitting reference signaling utilising an antenna array, wherein the reference signaling is transmitted in a pattern, the pattern being determined based on a beamforming state for transmitting the reference signaling and/or based on a beam reception state. The method may comprise determining the pattern.

Determining the pattern may comprise determining the density of the pattern. The density may be a symbol and/or signaling density and/or a resource (e.g., RE) density. It may be considered that the density is a density in time and/or frequency. Determining the number or quantity of symbols and/or signals and/or resources (e.g., REs) to be used for reference signaling and/or their arrangement, for a given time interval (e.g., TTI, slot or subframe) and/or frequency range (e.g., carrier or spectral band) and/or a for a time/frequency resource block like a PRB may be considered as determining the density of the pattern. Determining the pattern may generally comprise selecting or choosing a pattern based on the beamforming state and/or beam reception state. Determining the pattern may comprise determining the beamforming state and/or beam reception state, and/or configuring the pattern, e.g. for transmitting the reference signaling. Determining the pattern may comprise determining a pattern having more resources and/or a larger density for transmitting reference signaling for a beamforming state having a first angle (which may be wide) and determining a pattern having less resources and/or a lower density for transmitting reference signaling for a beamforming state having a second angle which is smaller than the first angle (narrow angle). Determining the pattern may comprise configuring the pattern for transmitting, e.g. such that the network node transmits the reference signaling in and/or according to the pattern, e.g. using the resources of the pattern for transmitting.

Alternatively or additionally, determining the pattern may be based on received signaling. The received signaling may be a report, which may be received from a terminal. The report may pertain to reference signaling, and/or be a beam selection report and/or measurement report and/or a pattern report. The network node may comprise a receiving module for receiving such signaling.

It may be considered that transmitting comprises successively transmitting a first beam having a first angular size, and a second beam having a second angular size, the first angular size being different than the second angular size, wherein reference signaling of the first beam has a pattern different from reference signaling of the second beam. The second beam may be narrower than the first beam. Generally, transmitting a first beam may comprise transmitting a plurality of first (wide) beams, and transmitting a second beam may comprise transmitting a plurality of second (narrow) beams; wherein the second beams may replace one (chosen) first beam. This may be performed with a third or even more beams, which may successively be narrower. The pattern of the second beam may be determined to have less resources (fewer REs) and/or lower density than the pattern of the first beam. Generally, a pattern having lower density than another pattern may refer to the reference signaling transmitted in the pattern having a density in the beam it is transmitted in that is lower than the density of the reference signaling transmitted in the other pattern in the beam the other pattern is transmitted in.

Generally, the network node may be adapted for, and/or comprise a configuring module for, and/or the method may comprise, configuring a terminal with a pattern configuration. The pattern configuration may generally represent and/or indicate the pattern and/or one or more characteristics of the pattern.

In addition, there may be considered a terminal for a wireless communication network. The terminal is adapted for providing a pattern report pertaining to received reference signaling based on a pattern configuration. The terminal may comprise a reporting module for providing the report, and/or a terminal receiving module for receiving the configuration.

A method for operating a terminal in a wireless communication network may also be considered. The method comprises providing a pattern report pertaining to received reference signaling based on a pattern configuration.

Providing a pattern report may comprise transmitting a report pertaining to the pattern and/or based on the pattern. A pattern report may indicate and/or be based on receiving and/or measuring reference signaling. Alternatively or additionally, the report may be provided internally (for the terminal itself), e.g. representing decoding and/or decoding results. A pattern report may comprise a measurement report and/or beam selection report. Yet more alternatively or additionally, a pattern report may represent decoded reference signaling and/or data decoded based on reference signaling. Providing a pattern report based on a pattern configuration may comprise considering information representing the pattern indicated by the configuration, e.g. the arrangement and/or number of the symbols and/or signals and/or REs of the pattern. For example, measurements may be performed to cover the REs of the pattern in time and/or frequency, and/or decoding may be performed to consider the reference signaling pattern.

Generally, the terminal may be in or for a wireless communication network having a network node as described herein.

Moreover, a program product comprising code executable by control circuitry is described, the code causing the control circuitry to carry out and/or control any one of the methods described herein.

A carrier medium carrying and/or storing a program product described herein and/or code executable by control circuitry is described as well, the code causing the control circuitry to perform and/or control any one of the methods described herein.

With the approaches described herein, reference signaling patterns (respectively associated resources) may be adapted to different scenarios in the context of beamforming. In particular with Massive MIMO systems, which produce larger numbers of different beams of different size, this facilitates reducing overhead for reference signaling while ensuring that the reference signaling may be received and measured with sufficient accuracy.

BRIEF DESCRIPTION OF DRAWINGS

The drawings are provided to illustrate concepts and approaches of the disclosure and are not intended as limitation. The drawings comprise.

DETAILED DESCRIPTION

Figure 1:
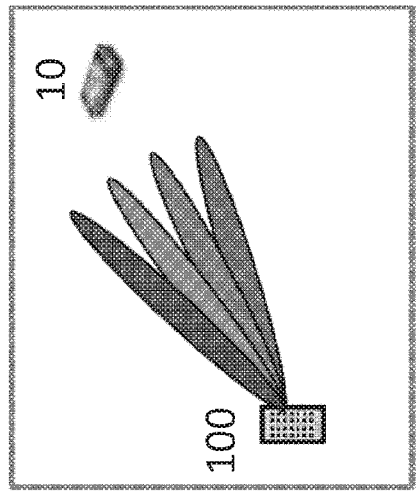
FIG. 1, showing a beam selection process.
Figure 1:
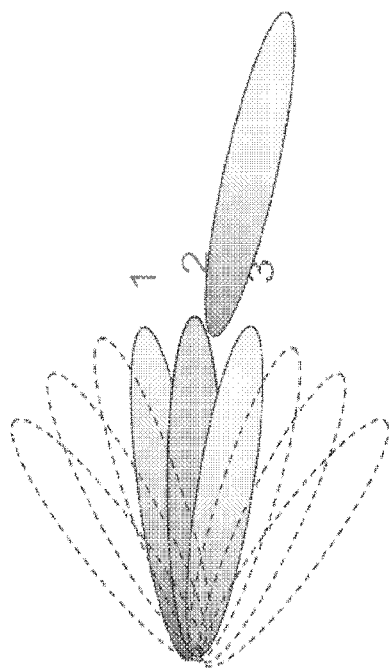
Figure 1:
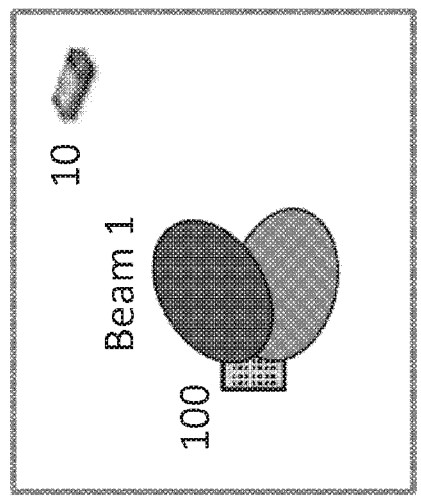
Figure 1:
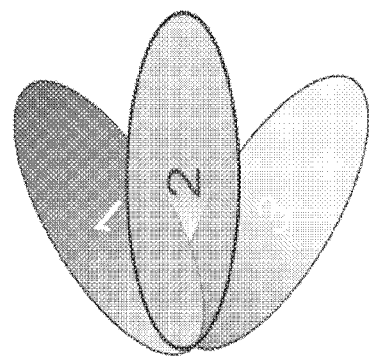

A pattern may define the resource distribution, in particular in time/frequency and/or power, used for the reference signaling respectively its transmission. A pattern may be defined in regards to, and/or comprise or indicate, a density (of symbols or signaling) in time and/or frequency, e.g. in terms of how may REs and/or symbols are transmitted in a given time interval like a TTI or subframe or slot, and/or on a carrier or frequency range, in particular pertaining to the number of subcarrier used for RS transmission. Generally, to different beamforming states and/or different beam reception states, there may be associated different patterns.

A beamforming state may be represented by any indication, in particular any parameter or parametrisation indicating or representing of defining the beamforming used or intended for use or determined for transmitting the reference signaling. Such indication may comprise the beamforming gain and/or precoder/precoding, respectively the weights used for such, and/or an index representing it.

A beam reception state may pertain to the reference signaling, in particular its purpose and/or intended use, and/or form, e.g. pattern. This particular pertains to the purpose and/or intended use for the receiver, e.g. a terminal. For example, measurement/s to be performed on the reference signaling, and/or report/s to be provided, by a receiver like a terminal may represent a beam reception state. Different kinds of measurements, differing e.g. in terms of frequency and/or quality and/or required quality, may be considered to represent different beam reception states. Alternatively or additionally, the reference signaling may be intended to facilitate decoding and/or rate matching of signals. The network node may be adapted to determine and/or consider the beam reception state, based on information stored in the network node (respectively, associated memory) and/or provided thereto, e.g. by the network and/or the receiver (e.g., a terminal). Generally, it may be assumed that the network node is aware of the beam reception state when determining the pattern and/or reference signaling. Beam selection (phase) and beam tracking (phase), which may require different kinds/quality of measurements) may be considered different beam reception states.

Beamforming may generally refer to transmitting beamformed signaling by controlling multiple antennas of an antenna array to produce a beam of radiation, which may have a main lobe in a main direction (which may represent the beam itself), and may comprise more or less pronounced side-lobes. To control antenna elements for beamforming, a precoder and/or weights may be provided or utilised, which may represent which antenna elements are to be used for a beam and/how they are to be controlled for beamforming, e.g. in regards to amplitude, timing, frequency and/or phase. A beam may have an angular extension, which may be represented by a two-dimensional (e.g. horizontal or vertical, and/or more than one, e.g. one or more cuts, or horizontal and vertical) or three-dimensional (spatial or solid angle) angle or angular profile (angular distribution or DoA, Distribution over Angle, which may be a power or energy or associated density distribution). A beam may be considered broader or wider than another beam, if it has a wider angle (this may refer to a specific direction or plane/cut, respectively to a widest angle or an angle at a specific location or plane). A narrow-angle beam generally is narrower (in angle) than a wide-angle beam. For different beams, different antennas and/or different number of antennas may be used. In particular, for narrower beams a larger number of antennas may be used than for wider beams. An unprecoded beam (e.g. only one antenna used) may be considered as a form of wide-angle beam with a specific precoder providing the wide-angle beam. The coverage (in particular coverage area) of a beam is dependent on the width/angular extension of a beam. A precoded beam may be targeted at a specific terminal or (small) group of terminals.

A first beam may be a wide-angle and/or non-precoded beam, a second beam may be a precoded beam and/or a narrow-angle beam. The narrow-angle beam may be narrower than the wide-angle beam. It should be noted that precoded signaling may be considered to represent beam formed signaling, which may use a precoder and/or a precoded beam. Non-precoded signaling may represent non-beamformed signaling or signaling with a wide-angle beam, which may cover a large part of a cell (e.g., in terms of angular extension and/or area covered by the cell), e.g. at least ⅓, or at least ½, or at least ⅔, or at least ¾, or at least 9/10 of the cell, and/or which may cover a significant number of terminals in the cell, e.g. at least 33%, and/or at least 50% and/or at least 66% and/or at least 75% and/or at least 90%. Differently precoded beams, and non-precoded or wide-angle beam, may be considered to represent different beamforming states.

Reference signaling may be transmitted for and/or in a cell, which may be a serving cell of the network, and/or pertaining to a carrier (frequency), which may represent a central frequency and/or frequency band for transmission. Reference signaling may generally comprise one or more signals or symbols.

Generally, different kinds of reference signaling may be considered, e.g. two kinds of CSI-RS (Channel State Information-Reference Signaling) in the context of LTE or similar technologies. One is non-precoded CSI-RS, and one is precoded CSI-RS. For non-precoded CSI-RS, the CSI-RS is transmitted without precoding or with wide-angle precoding to cover many or all the UEs in the associated cell. For precoded CSI-RS, the CSI-RS is transmitted with precoding. Precoded CSI-RS can reduce the CSI-RS overhead when massive MIMO is introduced.

Generally, in Massive MIMO operation, there may be two or more phases, one of which may referred to as beam selection phase, and one of which may be referred to as beam tracking phase. For the beam selection and refinement (tracking) phases, there may be several actions.

In the beginning, for example in a beam selection phase, the network node (base station or eNB) will use one or more wider beams to have wider coverage since it doesn't know the (exact) position of a target terminal or UE. A terminal or UE will select one beam index from the wider beam/s received and report the beam index to the network node or eNB, e.g. in form of a measurement report. With the beam index report, the network node or eNB will further form narrower beams to cover the area which is covered by the wider beam selected by the terminal. This procedure may be repeated with increasingly narrower beams, until the network node or eNB finds the terminal's or UE's (sufficiently) accurate beam location. In the beams, reference signaling, e.g. CSI-RS may be transmitted by the network node and/or received by terminal or UE. The terminal or UE may perform measurements on such reference signaling, based on which a beam may be selected and/or a measurement report may be determined and transmitted, e.g. from the (target) terminal to the network node. This approach is applicable for a beam selection phase, in which e.g. a beam to communicate with the terminal is chosen. However, it may also be applied to a beam tracking phase, in which different measurement requirements hold, respectively different beams are tracked or monitored.

As shown in FIG. 1, a network node 100, implemented in this non-limiting example as eNB (eNodeB, a base station e.g. for LTE), may utilise an antenna array to transmit different beams. A terminal 10, implemented in this non-limiting example as UE (User Equipment), may receive one or more of these beams, depending on its position, and may perform measurements on the beams (and/or on reference signaling transmitted in the beams), in particular to determine which of the beams is the most suitable for the terminal 10. In the first phase, wider beams (beam 1 and beam 2) may be used, which may e.g. carry CSI-RS as reference signaling.

The terminal or UE 10 shown in FIG. 1 will select one of the (wider) beams, e.g. beam 1, and report it to the eNB, for example in a beam selection report, which may be a measurement report or another form of report, e.g. a dedicated report. The lower row in FIG. 1 shows more abstractly a similar situation, in which beam 2 in phase 1 is chosen and replaced with narrower beams 1, 2 and 3 in phase 2, from which e.g. beam 2 may be shifted further on, e.g. for tracking purposes.

Based on the report, the eNB will form a plurality of narrow beams in the second phase to cover (at least) the area which is covered by the chosen beam 1 in the first phase. This procedure may be repeated with successively smaller beams in additional phases, such that the chosen beams will become narrower with more information (reports) from the UE. The beamforming gain is increased when the beam becomes narrower. It may generally be considered that the procedure identifies that none of the smaller beams in one of the phases 2 or later is suitable. For example, the terminal/UE 10 may provide a corresponding report to the network node/eNB 100. In this case, the network node/eNB 100 may be adapted to choose the (wide) beam from the previous phase as a final beam. Generally, the procedure may provide a final beam after a number of successive phases, which may have desired width/coverage and/or beamforming gain and/or channel or reception quality.

In LTE Rel-13/Rel-14, the CSI-RS resource allocation is independent of the beamforming schemes and the same CSI-RS density will be used for both wider beam and narrow beam. In massive MIMO case, it may be difficult to balance the accuracy of narrow beam estimation, wide beam estimation and CSI-RS overhead if the same CSI-RS density is used for both narrow beam and wide beam.

For example, it may be assumed that the beamforming gain is 0 dB when the widest beam is formed, the beamforming gain with narrowest beam could be up to 21 dB (equal to 10*log 10(128)) when 128 antennas are used, and the narrowest beamforming gain could be up to 30 dB (equal to 10*log 10(1024)) when 1024 antennas are used. Assuming further that the narrowest beam is applied for a UE at the cell edge, and the SNR (Signal-to-Noise Ratio) is 5 dB with beamforming gain, the SNR for the widest beam estimation is only about −16 dB when 128 antennas are used, and −25 dB when 1024 antennas are used. With such low SNR, it is quite challenging to get the right wide beam index feedback (beam selection report). If the wider beam is selected with error, however, system efficiency will break down. In order to get a sufficiently accurate wide beam estimation, more CSI-RS resources could be allocated to compensate the coverage loss for wide beam, which would lead to a large overhead of subsequent narrow beams with the same density of reference signaling. This is particularly pertinent for Massive MIMO, in which an ever-increasing number of narrower beams is to be expected with increasing number of antennas per antenna array.

In order to handle the problem of the estimation accuracy based on the CSI-RS caused by the coverage imbalance for the narrow beam and wider beam, it is proposed to adapt the CSI-RS pattern according to the beamforming state and/or beam reception state, e.g. precoding used for the beam as beamforming state and/or measurement purpose as beam reception state. This approach can reduce the CSI-RS overhead and improve the estimation accuracy for both wider beam and narrower beam.

The proposed approach allows any of:
- a good balance of the performance of reference signaling/CSI estimation from reference signaling like CSI-RS with for the wide beam and narrow beam for massive MIMO;
- It can reasonably reduce the reference signaling/CSI-RS overhead for massive MIMO without performance loss.
- The measurement report/CSI can be well provided to perform link adaption within the beam refinement process.
- The signaling to indicate the CSI-RS pattern can be reduced with the proposed approach.

Generally, an adaptive RS pattern according to the beamforming gain and measurement purpose may be implemented.

Herein, CSI-RS is referred to as exemplary form of reference signaling (short RS) for ease of discussion, and since it is particularly suitable for LTE. However, the approaches described herein are not necessarily limited to LTE and/or CSI-RS, but may be used in the context of other form of reference signaling, e.g. DMRS, or BRS or MRS or 5G or even 3G reference signaling in the context of large antenna arrays.

Further, the RS may be used for measurement, which is similar like CSI-RS in current LTE. It may be used for decoding, which is similar like DMRS in current LTE. The description given herein focuses on measurement. However, the concepts disclosed herein are not limited to measurement, it can be applied for other purposes, such as demodulation.

Generally, there may be considered a network node adapted for, and/or which performs, providing RS/CSI RS and/or associated measurements, comprising:
- Determining the precoding weights for the precoded CSI-RS
- Configuring a first CSI-RS pattern when the determined precoding weights are first beamforming weights and configuring the second CSI-RS pattern when the determined precoding weights are second beamforming weights. This may represent determining the pattern for reference signaling.
- As one example, when the beam width corresponding to the precoding weights is wider (which represents a first beamforming state), more resource will be provided in the CSI-RS pattern (a.k.a the first CSI-RS pattern), and when the beam width corresponding to the precoding weights (a.k.a the second beamforming weights or second beamforming state) is narrower, less resource (a.k.a the second CSI-RS pattern) can be allocated in the CSI-RS pattern. Similar coverage of wider beam and narrow beam will be achieved. The estimation accuracy for both wider beam and narrower beam will be expected to be similar by the adaptive change of CSI-RS pattern. Thus, depending on the beamforming state, the pattern for RS/CSI-RS is determined.

Generally, regardless of specific implementation, determining the pattern may comprise configuring the pattern, in particular configuring the RS/CSI-RS pattern. Determining or configuring the pattern may comprise and/or pertain to determining (respectively setting) and/or configuring:
- The density of RS/CSI-RS in time domain
- The density of RS/CSI-RS in frequency domain
- The multiplexing of RS/CSI-RS in code domain
- The position of RS/CSI-RS in time domain
- The position of RS/CSI-RS in frequency domain
- The code used for RS/CSI-RS
- The power of RS/CSI-RS (transmission power)

These configuration aspects should not be constructed as limiting to the embodiments herein, but merely as an example made for illustrative purposes.

A first RS/CSI-RS pattern may be different from a second RS/CSI-RS pattern, in particular regarding any of the parameters or quantities indicated regarding determining the pattern. They can be a plurality of RS/CSI-RS patterns associated to different beamforming states and/or beam reception states.

Figure 2:
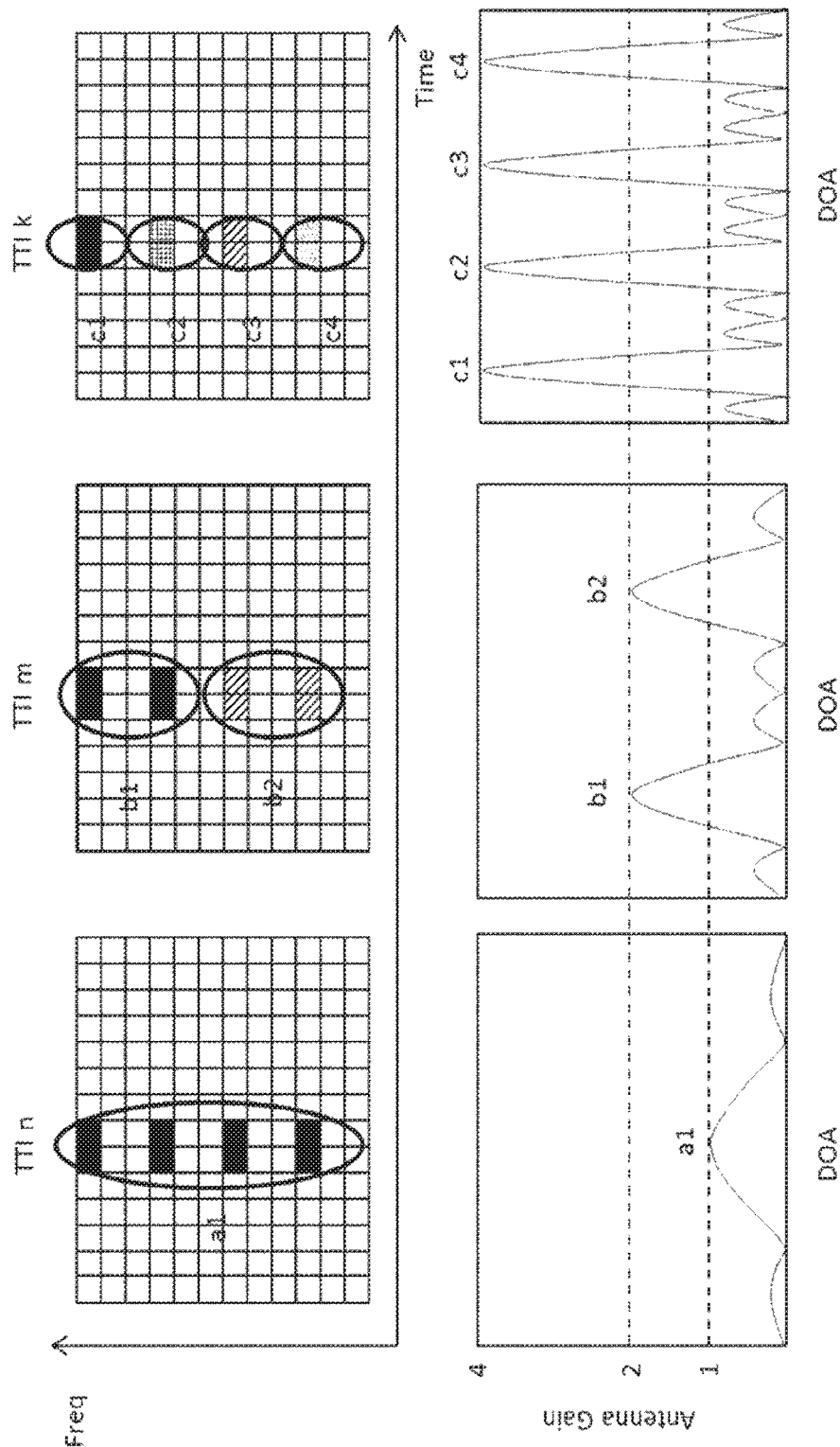
FIG. 2, showing example patterns for different beamforming states (precoding weights)

One example is shown in FIG. 2. In the $n^{th}$ TTI, beam a1 is used. In the $m^{th}$ TTI, beam b1, b2 are used, and in the $k^{th}$ TTI, beam c1, c2, c3 and c4 are used. The beamforming gain is 1 for beam a1, 2 for beam b1 and b2, and 4 for c1, c2, c3 and c4. The beam width of a1 is larger than beam b1 and b2, and much larger than beam c1, c2, c3 and c4. In order to handle the coverage loss of beam a1, 8 REs are allocated for beam a1, marked as grey in the $n^{th}$ TTI. 4 REs are allocated for beam b1 and b2, respectively, while only 2 REs are allocated for c1, c2, c3 and c4 respectively. More REs are allocated for the wide beam, hence, it is expected that the receiving UE can get more accurate channel estimation and thus more accurate beam selection for beam a1. For narrower beams, the REs are reduced, but the beamforming gain is increased, hence, a reliable estimation is facilitated for beam c1, c2, c3 and c4. Hence, it can be avoided that the UE makes a wrong choice about the beam selection either for c1, c2, c3 and c4 even though less REs are allocated.

Similarly, the density of RS/CSI-RS in time domain may be changed, or the transmission power for RS/CSI-RS, etc.

There may be considered that a network node is adapted for, and/or performs providing RS/CSI-RS and/or associated measurements, comprising:
- Determining the measurement purpose for (e.g., unprecoded and/or precoded) RS/CSI-RS and optionally data
- Configuring a (third) RS/CSI-RS pattern when a first purpose (measurement purpose or decoding purpose, for instance) is determined and configuring a (fourth) RS/CSI-RS pattern when a second (different) purpose (measurement purpose or decoding purpose, for instance) is determined. This may be seen as an example of determining the pattern based on beam reception state. Determining the pattern may be based on a third pattern that may be different from a fourth pattern.

RS/CSI-RS, in general, it can have two purposes, one is for beam selection, and one is for beam tracking. After a beam is determined, the UE needs to track the selected beam channel quality. In the same time, it may need to monitor other unselected beams in case UE moves out from the selected beam. For monitoring the unselected beam, the accuracy may be lower than the accuracy requirements for tracking the selected beam. Given that, when the beam width is similar, more resource (a.k.a the third CSI-RS pattern) may be allocated for the selected beam monitoring and less resource (a.k.a the fourth CSI-RS pattern) will be allocated for the unselected beam selection. The advantage of this allocation is to provide good accuracy for selected beam tracking.

Figure 3:
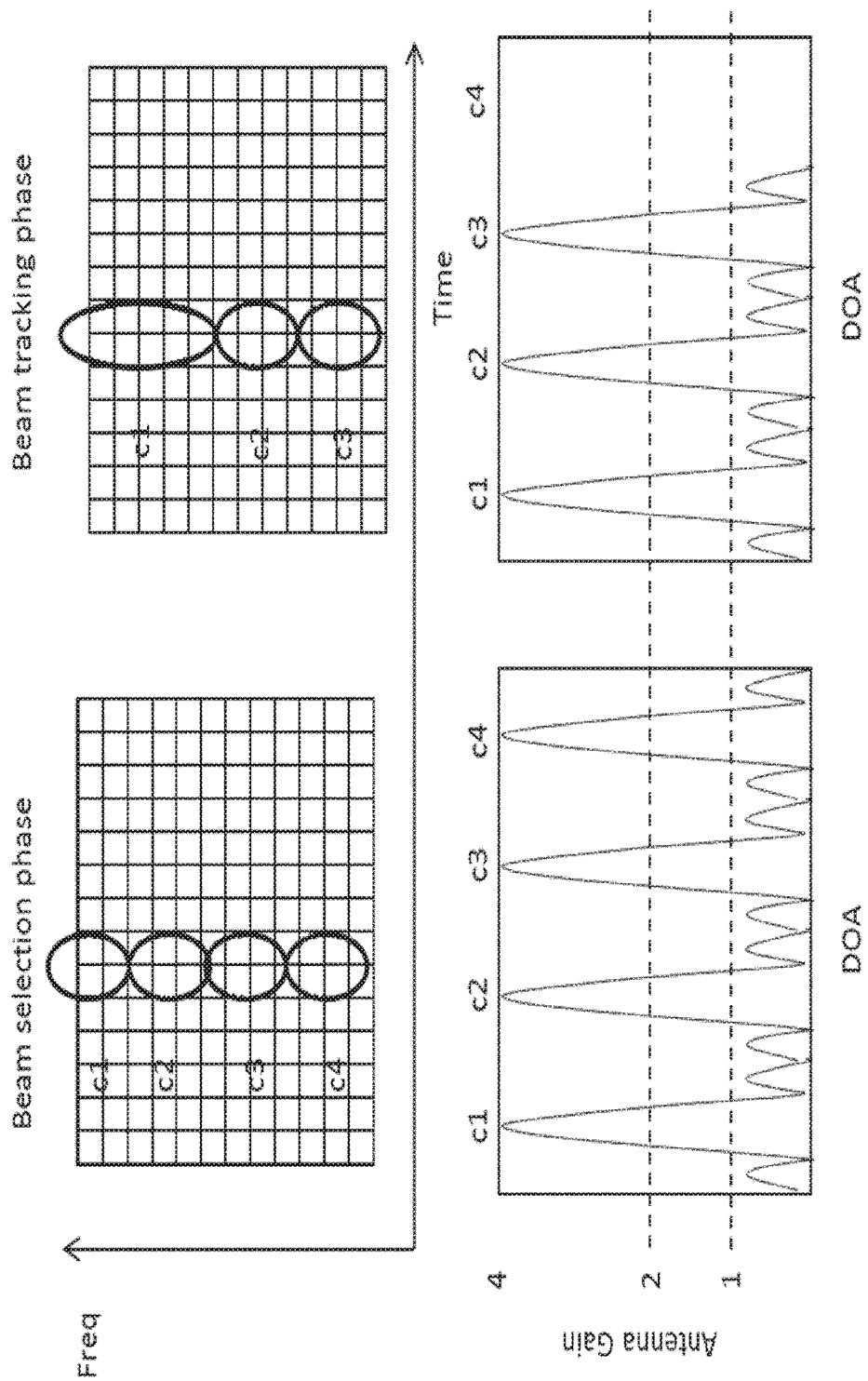
FIG. 3, showing example patterns for different beam reception states.

One example is shown in FIG. 3. In the beam selection phase, both c1, c2, c3 and c4 are transmitted, and 2 REs are allocated for each beam. In case UE select c1 as the served beam and report it to eNB, eNB can put more REs for beam c1 in the beam tracking phase. For example 4 REs are allocated for beam c1 and for more accurate tracking, while the same resource is kept for c2 and c3 and remove the resource for c4, etc.

The method may further comprise determining or configuring the pattern or RS/CSI-RS pattern based on the determined results of both the precoding weights and measurement purposes. This represent a case of determining the pattern based on the beamforming state and the beam reception state. Determining the pattern based on beamforming state and beam reception state may also be based on different states or parameter combinations.

The network node, e,g, eNB, may generally be adapted for, and/or perform, indication, e.g. implicitly or explicitly, in particular by providing a corresponding indicator and/or configuration (e.g., configuring such a configuration for the terminal) indicating information for one or more of The CSI-RS configuration information,
Beam configuration information, and
Measurement purpose information, etc., The information may be carried by one or more of MAC control element, system information, physical layer signal, RRC signaling etc; and/or generally as a configuration or configuration data.

As one example of the configuration, the information about the number of REs used for CSI-RS (N) is signaled or predefined, and the information about the number of used beams (K) in the CSI-RS is also signaled or predefined. The RE for each beams are determined by the N and K. For example, when (N,K)=(8, 1): it informs UE all the 8 REs use the same precoding and UE can use all 8 REs for the channel estimation for the assigned beam (N,K)=(8, 2): it informs UE two beams are used in the CSI-RS, the first four REs are used for the first beam, and the second four REs are used for the second beam (N,K)=(8,4): It informs UE 4 beams are used in the CSI-RS, the first two REs are used for the first beam, the second two REs are used for the second beam, the third two REs are used for the third beam, and the fourth two REs are used for the fourth beam.

(N,K)=(8,3): it informs UE 3 beams are used in the CSI-RS, the first four REs are used for the first beam, the last four REs used for beam 2 and beam 3. Two REs for each of beam 2 and beam 3.

The terminal/UE may be adapted to receive the configuration and/or to perform measurements based on the configuration. The network node may be adapted for configuring the terminal/UE accordingly.

In the above example, the RS/CSI-RS or pattern configuration may be semi-static configure and the beam configuration may be dynamically configured.

As another example, multiple pattern or RS/CSI-RS configurations may be signaled and the selection of the pattern or RS/CSI-RS configuration may be dynamically informed.

Nested CSI-RS design is described in the following. The second CSI-RS pattern may be a subset or subpattern of the first CSI-RS pattern. Alternatively or additionally, the fourth CSI-RS pattern may be a subset or subpattern of the third CSI-RS pattern. A subset or subpattern may generally represent a part or cut of a pattern.

In some embodiment, the union of the four CSI-RS patterns is equivalent to one larger CSI-RS pattern. As the example shown FIG. 3 the union of the four CSI-RS patterns includes 8 REs in total (in one PRB, note that one square of the grid represent one RE). It is the same as the REs included for the first CSI pattern. With this constraint, the CSI-RS allocated for one UE is not changed regardless of the change of beamforming weighting and measurement purpose.

The purpose of keeping the RS/CSI-RS for one UE unchanged is to reduce the overhead introduced from re-signaling the change to other UEs for control/data decoding. Assuming there are two UEs in the system (UE1 and UE2), when the CSI-RS resource is changed for UE1, the UE2 must get this information for control/data decoding since CSI-RS is across the whole bandwidth in general. When UE2 decodes its own data, it needs to remove the impact of CSI-RS REs reserved for UE1 first. Hence, if the resources of CSI-RS are changed for UE1, the corresponding change shall be signaled to both UE1 and UE2, introducing a lot of overhead. However, the same CSI-RS resources are kept, the signaling to UE2 may be avoided. Thus, a lot of signaling overhead can be reduced.

In some embodiment, the eNB will signal multiple RS/CSI-RS configurations to a UE, and inform the UE to use some of the CSI-RS configurations for measurements, and use some of the CSI-RS configuration for control/data rate matching/decoding. In this case, the CSI-RS configuration for control/data rate matching for this UE may be used for measurement for other UEs.

Figure 4:
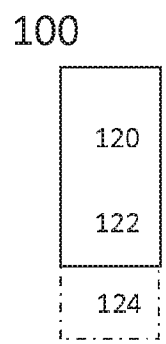
FIG. 4, showing an exemplary network node.

FIG. 4 schematically show a network node or base station 100, which in particular may be an eNodeB. Network node 100 comprises control circuitry 120, which may comprise a controller connected to a memory. Any module, e.g. receiving module and/or transmitting module and/or control or processing module, of the network node may be implemented in and/or executable by the control circuitry 120. The control circuitry is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. control circuitry. The antenna circuitry may be connected to and/or comprise an antenna array.

Figure 5:
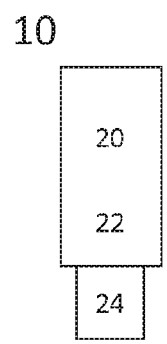
FIG. 5, showing an exemplary terminal.

FIG. 5 schematically shows a terminal 10, which may be implemented in this example as a user equipment. Terminal 10 comprises control circuitry 20, which may comprise a controller connected to a memory. Any module of the terminal, e.g. receiving module and/or transmitting module and/or control or processing module, may be implemented in and/or executable by, the control circuitry 20, in particular as module in the controller. Terminal 10 also comprises radio circuitry 22 providing receiving and transmitting or transceiving functionality, the radio circuitry 22 connected or connectable to the control circuitry. An antenna circuitry 24 of the terminal 10 is connected or connectable to the radio circuitry 22 to collect or send and/or amplify signals. Radio circuitry 22 and the control circuitry 20 controlling it are configured for cellular communication with a network on a first cell/carrier and a second cell/carrier, in particular utilizing E-UTRAN/LTE resources as described herein. The terminal 10 may be adapted to carry out any of the methods for operating a terminal disclosed herein; in particular, it may comprise corresponding circuitry, e.g. control circuitry.

Some useful abbreviations comprise:

| Abbreviation | Explanation |
| --- | --- |
| BA | Beam Angle |
| BS | Base Station |
| CSI | Channel State Information, information representing characteristics of reception based on measurements, reported to the network node; |
| CSI-RS | CSI reference signal/s |

| Abbreviation | Explanation |
| --- | --- |
| CQI | Channel-Quality Indicator |
| LTE | Long-Term Evolution, a telecommunications standard |
| PRB | Physical Resource Block |
| RAS | Reconfigurable Antenna Systems |
| RB | Resource Block |
| RI | Rank Indicator |
| RX | Reception, reception-related, Receiver |
| SINR | Signal-to-Interference and Noise Ratio |
| SIR | Signal-to-Interference Ratio |
| SNR | Signal-to-Noise Ratio |
| TTI | Transmission Time Interval |
| TX | Transmission, transmission-related, Transmitter |
| UE | User Equipment |

These abbreviations may be used according to LTE standard use, if applicable.

There may be considered a wireless transmitter and/or network node adapted for performing any one of the methods for operating a wireless transmitter and/or network node described herein.

There may be considered a terminal adapted for performing any one of the methods for operating a terminal described herein.

There is also disclosed a program product comprising code executable by control circuitry, the code causing the control circuitry to carry out and/or control any one of the method for operating a terminal or network node as described herein, in particular if executed on control circuitry, which may be control circuitry of a terminal or a network node as described herein.

Moreover, there is disclosed a carrier medium carrying and/or storing at least any one of the program products described herein and/or code executable by control circuitry, the code causing the control circuitry to perform and/or control at least any one of the methods described herein. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

Reference signaling may comprise one or more reference signals or symbols. Reference signals may be adapted or intended for a receiver (e.g., a terminal) to perform measurements on and/or to provide a measurement report on. Reference signals may be defined by a standard, e.g. CSI-RS defined by LTE. Measurement reporting and/or providing a measurement report may generally comprise transmitting a measurement report, in particular to a source/transmitter of reference signaling, e.g. a transmitting node or network node, and/or performing measurements, e.g. on reference signaling, and/or evaluating measurements (e.g., processing the measurement results). A measurement report may be based on the performed measurements and/or the evaluating. Generally, reference signaling may be cell-specific or receiver-specific. CSI-RS may be considered an example for receiver-specific reference signaling. Receiver-specific reference signaling may be intended for a specific receiver to perform measurements on, the receiver may be configured accordingly. Cell-specific reference signaling may be intended for all (or at least an unspecified number of) receivers in the cell to perform measurements on. Transmitting a reference signaling on more than one antenna element may comprise beamforming (e.g., of the reference signaling). Transmitting different reference signalings (e.g., a first and a second reference signaling), and/or on different antenna elements (for the same and/or different reference signaling) may be performed simultaneously, e.g. in the same time interval (e.g., symbol time interval, which may associated to a subframe), and/or such that symbols or signals of one reference signaling coincide with symbols or signals of the other reference signaling. A symbol of a reference signal may cover and/or comprise and/or represent one Resource Element, and/or a symbol time interval and an associated frequency range, e.g. a subcarrier. Reference signaling may be represented by a pattern, e.g. in time/frequency space. The pattern may represent symbols and/or signals and/or resources (e.g., REs), respectively their distribution (in particular, in time/frequency and/or power) used for the reference signaling, in particular in a given time interval, e.g. a TTI and/or over a subframe of slot.

Configuring (e.g., with or for a configuration) a device like a terminal or network node may comprise bringing the device into a state in accordance with the configuration. A device may generally configure itself, e.g. by adapting a configuration. Configuring a terminal, e.g. by a network node, may comprise transmitting a configuration or configuration data indicating a configuration to the terminal, and/or instructing the terminal, e.g. via transmission of configuration data, to adapt the configuration configured.

A configuration may in particular pertain to measurement reporting, e.g. to a CSI process. Measurement reporting may generally pertain to specific signaling (or an associated port), which may be indicated or configured to the terminal by the network or network node, e.g. by transmitting corresponding configuration data. Measurement reporting may generally indicate a preferred port or port combination (or precoder or precoder combination) to be used, which may be referred to as port or precoder selection. In particular, a configuration may indicate the pattern determined for RS and/or used for RS transmission (e.g., by the network node), in particular CSI-RS.

A measurement process like a CSI process may generally comprise receiving (e.g., by a UE), from a transmitting node or network node, reference signaling (CSI-RS), and providing a report like measurement report based on the received reference signaling. The report or measurement report may in particular indicate or comprise CSI information, in particular CQI (Channel Quality Indicator), PMI (Precoding Matrix Indicator) and/or RI (Rank Indicator), and/or a beam selection report or indication indicating which beam is selected by the measuring device like a terminal.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may involve one or more than one terminal connected to a wireless communication network and/or more than one node of a wireless communication network and/or in a wireless communication network. It may be envisioned that a node in or for communication, and/or in, of or for a wireless communication network is adapted for communication utilizing one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes and/or terminals of the communication. It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header.

Each node or terminal involved in communication may comprise radio circuitry and/or control circuitry and/or antenna circuitry, which may be arranged to utilize and/or implement one or more than one radio access technologies. Radio circuitry of a node or terminal may generally be adapted for the transmission and/or reception of radio waves, and in particular may comprise a corresponding transmitter and/or receiver and/or transceiver, which may be connected or connectable to antenna circuitry and/or control circuitry. Control circuitry of a node or terminal may comprise a controller and/or memory arranged to be accessible for the controller for read and/or write access. The controller may be arranged to control the communication and/or the radio circuitry and/or provide additional services. Circuitry of a node or terminal, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered.

A wireless or cellular network may comprise a network node, in particular a radio network node, which may be connected or connectable to a core network, e.g. a core network with an evolved network core, e.g. according to LTE. A network node may e.g. be a base station. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation. Operation and/or communication and/or exchange of signals without involvement of layers above a base station and/or without utilizing a predefined cell structure provided by a base station or eNB, may be considered to be D2D communication or operation, in particular, if it utilises the radio resources, in particular carriers and/or frequencies, and/or equipment (e.g. circuitry like radio circuitry and/or antenna circuitry, in particular transmitter and/or receiver and/or transceiver) provided and/or used for cellular operation.

A terminal may be implemented as a user equipment. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or a user equipment is adapted for one or more RATs, in particular LTE/E-UTRA. A terminal or user equipment may generally be proximity services (ProSe) enabled, which may mean it is D2D capable or enabled. It may be considered that a terminal or user equipment comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN.

A network node or base station may be any kind of base station of a wireless and/or cellular network adapted to serve one or more terminals or user equipments. It may be considered that a base station is a node or network node of a wireless communication network. A network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station, e.g. according to an LTE standard. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a coordinating node and/or to allocate resources in particular for cellular communication between two nodes or terminals of a wireless communication network, in particular two user equipments.

An antenna array may comprise a plurality of antennas or antenna elements, which may be individually controllable and/or be controllable for beamforming. An antenna array may in particular comprise 128 or more, or 256 or more, or 512 or more antenna elements. An antenna array, and/or the network node and/or associated circuitry, may be adapted for Massive MIMO.

Resources or communication resources or radio resources may generally be frequency and/or time resources (which may be called time/frequency resources). Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation or network node, may be adapted to determine and/or transmit corresponding allocation data indicating release or de-allocation of resources to one or more wireless devices, in particular to a first wireless device. Resources may be represented by resource blocks or resource elements (RE), the latter of which may represent a smallest allocatable block of time/frequency resource and/or a subcarrier in frequency space and a symbol time length in time, in particular for LTE.

A wireless communication network may generally be any network providing radio access for telecommunication. It may comprise a Radio Access Network (RAN), e.g. according to UMTS, LTE or a related standard, a Next Radio standard or generally a 4G or 5G standard. A network node may generally be any radio network node, e.g. of a RAN. For example, a network node may be a base station, eNodeB, macro node, micro node, relay node, etc. A terminal may be any device providing a possible termination point for telecommunication utilising the wireless communication network. The terminal may be adapted for communication with or via the network, in particular a network node of the network. A terminal may be implemented as a user equipment (UE), or Machine-Type-Communication (MTC) device. It may be considered that a terminal is mobile, however, stationary terminals may be envisioned. A terminal may in particular be a smartphone, mobile phone, tablet, laptop, desktop computer, sensor arrangement or a machine adapted e.g. for MTC.

In this description, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) or Next Radio mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

The invention claimed is:

1. A network node configured to operate within a wireless communication network, the network node comprising control circuitry configured to:
    determine a first resource element (RE) density pattern based on first precoding weights,
    transmit, utilizing an antenna array, first reference signaling according to the first RE density pattern towards a terminal operating within the wireless communication network,
    receive a measurement report of the first reference signaling from the terminal,
    determine second precoding weights based on the measurement report and one or more of a beamforming state and a beam reception state, transmit, towards the terminal utilizing the antenna array, second reference signaling according to a second resource element (RE) density pattern, the second RE density pattern being determined based on the measurement report and the second precoding weights, wherein the second RE density pattern utilizes less resource elements (REs) than the first RE density pattern.

2. The network node according to claim 1, wherein determining the second RE density pattern comprises selecting the second RE density pattern from a set of predefined RE density patterns, and wherein the first RE density pattern and the second RE density pattern are included in the set of predefined RE density patterns.

3. The network node according to claim 1, wherein the control circuitry is further configured to:
successively transmit a first beam associated with the first reference signaling having a first angular size, and a second beam associated with the second reference signaling having a second angular size, the first angular size being different than the second angular size.

4. A method of operating a network node in a wireless communication network, the method comprising:
determining a first resource element (RE) density pattern based on first precoding weights,
transmitting, utilizing an antenna array, first reference signaling according to the first RE density pattern towards a terminal operating within the wireless communication network,
receiving a measurement report of the first reference signaling from the terminal, receive a measurement report of the first reference signaling from the terminal,
determining second precoding weights based on the measurement report and one or more of a beamforming state for transmitting the second reference signaling and a beam reception state,
transmitting, towards the terminal utilizing the antenna array, second reference signaling according to a second RE density pattern, the second RE density pattern being determined based on the measurement report and the second precoding weights, wherein the second RE density pattern utilizes less REs than the first RE density pattern.

5. The method according to claim 4, wherein determining the second RE density pattern comprises selecting the second RE density pattern from a set of predefined RE density patterns, and wherein the first RE density pattern and the second RE density pattern are included in the set of predefined RE density patterns.

6. The method according to claim 4, the method further comprising:
successively transmitting a first beam associated with the first reference signaling having a first angular size, and a second beam associated with the second reference signaling having a second angular size, the first angular size being different than the second angular size.

7. A terminal configured to operate in a wireless communication network, the terminal comprising control circuitry configured to:
receive first reference signaling transmitted by a network node operating in the wireless communication network according to a first resource element (RE) density pattern, wherein the first RE density pattern is associated with first precoding weights,
provide a measurement report pertaining to the first reference signaling based on the first RE density pattern to the network node, and
responsive to providing the measurement report to the network node, receive second reference signaling transmitted by the network node according to a second resource element (RE) density pattern, wherein the second RE density pattern is associated with second precoding weights based on the measurement report, a beamforming state for transmitting the second reference signaling and a beam reception state,
wherein the first RE density pattern comprises a first density of REs in time and frequency within a first time interval and the second RE density pattern comprises a second density of REs in time and frequency within a second time interval.

8. A method to operate a terminal in a wireless communication network, the method comprising:
receiving first reference signaling transmitted by a network node operating in the wireless communication network according to a first resource element (RE) density pattern, wherein the first RE density pattern is associated with first precoding weights,
providing a measurement report pertaining to the received first reference signaling based on the first RE density pattern to the network node, and
responsive to providing the measurement report to the network node, receiving second reference signaling transmitted by the network node according to a second resource element (RE) density pattern, wherein the second RE density pattern is associated with second precoding weights based on the measurement report, a beamforming state for transmitting the second reference signaling and a beam reception state,
wherein the first RE density pattern comprises a first density of REs in time and frequency within a first time interval and the second RE density pattern comprises a second density of REs in time and frequency within a second time interval.

9. The network node according to claim 2, wherein the control circuitry is further configured to provide the set of predefined RE density patterns to the terminal.

10. The network node according to claim 2, wherein each RE density pattern of the set of predefined RE density patterns is associated with one or more beams to be used to transmit the associated reference signaling.

11. The network node according to claim 2, wherein each RE density pattern of the set of predefined RE density patterns is associated with one or more of a corresponding beamforming state and a beam reception state.

12. The network node according to claim 1, wherein the control circuitry is further configured to:
transmit, utilizing the antenna array, third reference signaling according to a third resource RE density pattern towards the terminal operating within the wireless communication network, wherein the third resource RE density pattern is different from the first and second RE density patterns,
receive a measurement report of the third reference signaling from the terminal,
transmit, utilizing the antenna array, fourth reference signaling according to a fourth RE density pattern towards the terminal, the fourth RE density pattern being determined based on the measurement report of the third reference signaling and one or more of a beamforming state for transmitting the fourth reference signaling and a beam reception state, wherein the fourth RE density pattern is different than the first, second, and third RE density patterns.

13. The terminal according to claim 7, wherein the control circuitry is further configured to:

receive a set of predefined RE density patterns from the network node, and wherein the first RE density pattern and the second RE density pattern are included in the set of predefined RE density patterns, wherein receiving the first reference signaling comprises receiving the first reference signaling based on the first RE density pattern included in the set of predefined RE density patterns from the network node, and wherein receiving the second reference signaling comprises receiving the second reference signaling based on the second RE density pattern included in the set of predefined RE density patterns from the network node.

14. The terminal according to claim 7, wherein the control circuitry is further configured to:

receive third reference signaling according to a third resource RE density pattern from the network node utilizing an antenna array and operating within the wireless communication network, wherein the third resource RE density pattern is different from the first and second RE density patterns, provide a measurement report pertaining to the received third reference signaling based on the third RE density pattern to the network node, and responsive to providing the measurement report to the network node, receive fourth reference signaling according to a fourth RE density pattern from the network node utilizing the antenna array, wherein the fourth RE density pattern is different than the first, second, and third RE density patterns.

15. The terminal according to claim 7, where the measurement report includes a selection of a beam associated with the second RE density pattern.

16. The network node according to claim 1, wherein the first RE density pattern comprises a first density of REs in time and frequency within a first time interval and the second RE density pattern comprises a second density of REs in time and frequency within a second time interval.

17. The method according to claim 4, wherein the first RE density pattern comprises a first density of REs in time and frequency within a first time interval and the second RE density pattern comprises a second density of REs in time and frequency within a second time interval.

\* \* \* \* \*